(12) United States Patent
Shirayanagi

(10) Patent No.: US 6,193,370 B1
(45) Date of Patent: Feb. 27, 2001

(54) METHOD OF MANUFACTURING PROGRESSIVE POWER SPECTACLE LENSES

(75) Inventor: Moriyasu Shirayanagi, Tokyo (JP)

(73) Assignee: Asahi Kogaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/292,979

(22) Filed: Apr. 16, 1999

(30) Foreign Application Priority Data

Apr. 17, 1998 (JP) .................................... 10-107965

(51) Int. Cl.⁷ .................................................. G02C 7/06
(52) U.S. Cl. ............................. 351/177; 351/169
(58) Field of Search ...................... 351/168, 169, 351/170, 171, 172, 177

(56) References Cited

U.S. PATENT DOCUMENTS

| 3,867,798 | 2/1975 | Masucci | 51/284 |
| 4,950,057 | 8/1990 | Shirayanagi | 351/169 |
| 5,270,745 | 12/1993 | Pedrono | 351/169 |
| 5,272,495 | 12/1993 | Pedrono | 351/169 |
| 5,444,503 | * 8/1995 | Kelch et al. | 351/169 |
| 5,446,508 | 8/1995 | Kitchen | 351/169 |
| 5,640,775 | 6/1997 | Marshall | 33/28 |
| 5,708,492 | 1/1998 | Kitani | 351/169 |
| 5,844,657 | 12/1998 | Shirayanagi | 351/169 |

FOREIGN PATENT DOCUMENTS

| 52057/98 | 7/1998 | (AU) . |
| 880046 | 11/1998 | (EP) . |
| 2241911 | 9/1991 | (GB) . |
| 2259662 | 3/1993 | (GB) . |
| 10206805 | 12/1970 | (JP) . |
| 98/16862 | 10/1997 | (JP) . |

* cited by examiner

Primary Examiner—Scott J. Sugarman
(74) Attorney, Agent, or Firm—Greenblum & Bernstein P.L.C.

(57) ABSTRACT

A method of manufacturing progressive power spectacle lenses includes preparing individual fitting condition data for a lens-wearer such as object distances for near and distance vision, the distance from the point-of-rotation of each eyeball of a lens-wearer to each spectacle lens, the pantoscopic angle of the spectacle lenses when fitted onto said lens-wearer, and determining an amount of inset in accordance with said individual fitting condition data.

20 Claims, 11 Drawing Sheets

Fig. 5

| OD | 200.00 | 250.00 | 333.00 | 500.00 | 333.00 | 333.00 | 333.00 | 333.00 | 333.00 | 333.00 | 333.00 |
|---|---|---|---|---|---|---|---|---|---|---|---|
| PD | 65.00 | 65.00 | 65.00 | 65.00 | 75.00 | 70.00 | 65.00 | 60.00 | 65.00 | 65.00 | 65.00 |
| EP | 25.00 | 25.00 | 25.00 | 25.00 | 25.00 | 25.00 | 25.00 | 25.00 | 29.00 | 27.00 | 25.00 | 23.00 |
| DF | ΔH | ΔH | ΔH | ΔH | ΔH | ΔH | ΔH | ΔH | ΔH | ΔH | ΔH | ΔH |
| -10.00 | 1.07 | 0.55 | 0.00 | -0.58 | 0.22 | 0.11 | 0.00 | -0.11 | 0.15 | 0.08 | 0.00 | -0.09 |
| -8.00 | 1.11 | 0.57 | 0.00 | -0.60 | 0.22 | 0.11 | 0.00 | -0.11 | 0.17 | 0.09 | 0.00 | -0.09 |
| -6.00 | 1.15 | 0.59 | 0.00 | -0.62 | 0.23 | 0.11 | 0.00 | -0.12 | 0.18 | 0.09 | 0.00 | -0.10 |
| -4.00 | 1.19 | 0.61 | 0.00 | -0.64 | 0.23 | 0.12 | 0.00 | -0.12 | 0.20 | 0.10 | 0.00 | -0.11 |
| -2.00 | 1.23 | 0.63 | 0.00 | -0.67 | 0.24 | 0.12 | 0.00 | -0.12 | 0.22 | 0.11 | 0.00 | -0.12 |
| 0.00 | 1.28 | 0.66 | 0.00 | -0.70 | 0.24 | 0.12 | 0.00 | -0.13 | 0.25 | 0.13 | 0.00 | -0.13 |
| 2.00 | 1.33 | 0.68 | 0.00 | -0.73 | 0.25 | 0.13 | 0.00 | -0.13 | 0.28 | 0.14 | 0.00 | -0.14 |
| 4.00 | 1.38 | 0.71 | 0.00 | -0.76 | 0.26 | 0.13 | 0.00 | -0.13 | 0.31 | 0.16 | 0.00 | -0.16 |
| 6.00 | 1.43 | 0.74 | 0.00 | -0.80 | 0.26 | 0.13 | 0.00 | -0.14 | 0.35 | 0.18 | 0.00 | -0.17 |
| 8.00 | 1.49 | 0.77 | 0.00 | -0.84 | 0.26 | 0.14 | 0.00 | -0.14 | 0.40 | 0.20 | 0.00 | -0.19 |
| 10.00 | 1.56 | 0.81 | 0.00 | -0.88 | 0.27 | 0.14 | 0.00 | -0.14 | 0.46 | 0.23 | 0.00 | -0.22 |

A / B / C

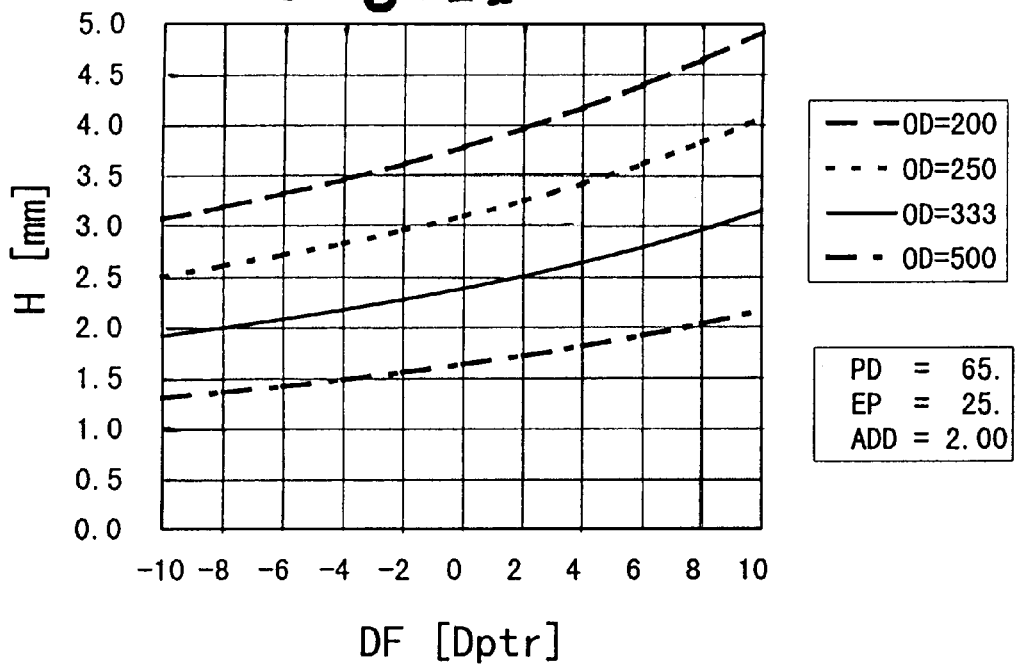
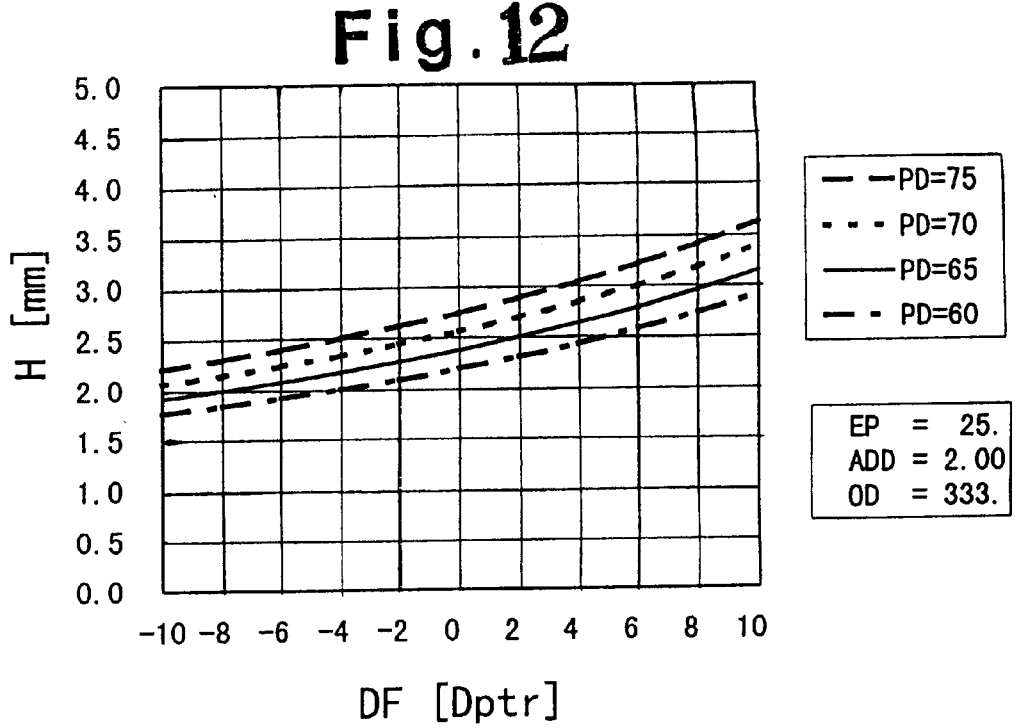

METHOD OF MANUFACTURING PROGRESSIVE POWER SPECTACLE LENSES

BACKGROUND OF THE INVENTION

1. Field of the Invention

The present invention relates to a method of manufacturing spectacle lenses and, in particular, progressive power spectacle lenses.

2. Description of the Related Art

As shown in FIG. 7, a conventional progressive power spectacle lens generally includes: a distance portion 11, which has a dioptric power for distance vision; a near portion 12, which has a dioptric power for near vision; an intermediate portion 13, which has a dioptric power at intermediate ranges between distance vision and near vision; and peripheral portions, i.e., right and left side portions 14 and 15.

A main meridian 16 can be defined on the spectacle lens, through which the line of sight of the lens-wearer frequently moves from near vision to distance vision (or vice versa). The main meridian 16 passes through the distance portion 11, the intermediate portion 13 and the near portion 12, approximately along the vertical center line of the lens. The lens is required to be designed so that aberrations along the main meridian 16 are well-correct ed. When the lens-wearer views an object at a near distance, the main meridian 16 approaches the nose (of the lens-wearer) because the line of sight of each eye moves inward (towards the nose). The horizontal displacement of the main meridian 16 towards the nose (i.e., the horizontal distance 'H' in FIG. 7) in the near portion is known as the amount of "inset".

In a conventional progressive power spectacle lens, the amount of inset is generally determined in the range of approximately 2.5 mm through 3.0 mm regardless of the dioptric power of the lens. However, changing the amount of inset of the progressive power spectacle lens in accordance with the dioptric power of the lens has been recently proposed.

FIGS. 8 and 9 show the principle of the necessity of changing the amount of inset in accordance with the dioptric power of the lens. In Figs.8 and 9, right and left eyeball are designated by "RE" and "LE", respectively, and the amount of inset of each lens is designated by "H". FIG. 8 shows the case when viewing an object 17 at a near distance through a pair of spectacle lenses each having a negative dioptric power. Right and left lines of sight 18 and 19 through the lenses are shown by solid lines, while right and left lines of sight 18 and 19 without the lenses are shown by dotted lines. As can be seen in FIG. 8, the lines of sight 18 and 19 are bent through the lenses toward each other. FIG. 9 shows an example of viewing an object 17 at a near distance through a pair of spectacle lenses each having positive dioptric power. As can be seen in FIG. 9, the lines of sight 18 and 19 are bent through the lenses in opposite directions away from each other. Considering the effect the lenses have, in order for the lens-wearer to be able to view an object at a near distance naturally with both eyes, it can be appreciated in the case of the negative lenses that the amount of inset H should be reduced, whereas in the case of the positive lenses that the amount of inset H should be increased.

Accordingly, the dioptric power (the distance portion vertex power and the addition power) is one of the factors for determining the optimum amount of inset. However, the inventor of the present invention has found that conventional progressive power spectacle lenses are manufactured so that the amount of inset is determined only in accordance with the dioptric power without taking into account individual differences in wearing state of the lenswearers. wearers. Hence, there is still room for further improvement of progressive power spectacle lenses.

SUMMARY OF THE INVENTION

The primary object of the present invention is to provide a method of manufacturing progressive power spectacle lenses wherein the amount of inset is determined in accordance with the individual fitting condition data of a lens-wearer so as to provide a pair of progressive power spectacle lenses through which an adequate clear view area for both eyes can be obtained for near vision.

To achieve the above-mentioned object, according to an aspect of the present invention, there is provided a method of manufacturing progressive power spectacle lenses, including preparing individual fitting condition data for a lens-wearer, and determining an amount of inset in accordance with the individual fitting condition data.

Preferably, the individual fitting condition data includes data regarding the object distance for near vision, the pupillary distance between both eyes for distance vision, the distance from the point-of-rotation of each eyeball of the lens-wearer to each the spectacle lens, the pantoscopic angle (tilt) of the spectacle lenses when fitted to the lens-wearer.

Preferably, the determining step includes determining a difference between an optimum amount of inset and an amount of inset according to a pre-determined standard.

Preferably, the manufacturing method includes: designing the shape of a progressive surface so that the amount of inset becomes identical to an optimum amount of inset determined in accordance with the. individual fitting condition data; and forming the progressive surface having the designed shape on the progressive side of a lens blank.

Preferably, the manufacturing method includes: preparing a progressive power semi-finished lens blank which is provided on a progressive side thereof with a progressive surface having an amount of inset according to a pre-determined standard; rotating the progressive power semi-finished lens blank to have a desired amount of inset; and grinding a non-progressive side of the progressive power semi-finished lens blank.

Preferably, the manufacturing method includes: preparing a progressive power semi-finished lens blank which is provided on a progressive side thereof with a progressive surface having an amount of inset according to a pre-determi ned standard; displacing a fitting point on the progressive power semi-finished lens blank to have a desired amount of inset; and grinding a non-progressive side of the progressive power semi-finished lens blank.

Preferably, the manufacturing method includes: preparing a progressive power semi-finished lens blank which is provided on a progressive side thereof with a progressive surface having an amount of inset according to a pre-determi ned standard; rotating the progressive power semi-finished lens blank while displacing a fitting point on the progressive power semi-finished lens blank to have a desired amount of inset; and grinding a non-progressive side of the progressive power semi-finished lens blank.

The present disclosure relates to subject matter contained in Japanese Patent Application No. 10-107965 (filed on Apr. 17, 1998) which is expressly incorporated herein by reference in its entirety.

BRIEF DESCRIPTION OF THE DRAWINGS

The present invention will be described below in detail with reference to the accompanying drawings in which:

FIG. 5 shows an example of a data table containing parameters for determining the change in the amount of inset in the third embodiment of the manufacturing method shown by the flow chart in FIG. 4;

FIG. 11 is a graph showing influence upon the optimum amount of inset when the object distance for near vision varies;

FIG. 12 is a graph showing influence upon the optimum amount of inset when the pupillary distance between both eyes for distance vision varies;

DESCRIPTION OF THE PREFERRED EMBODIMENTS

Figure 10:
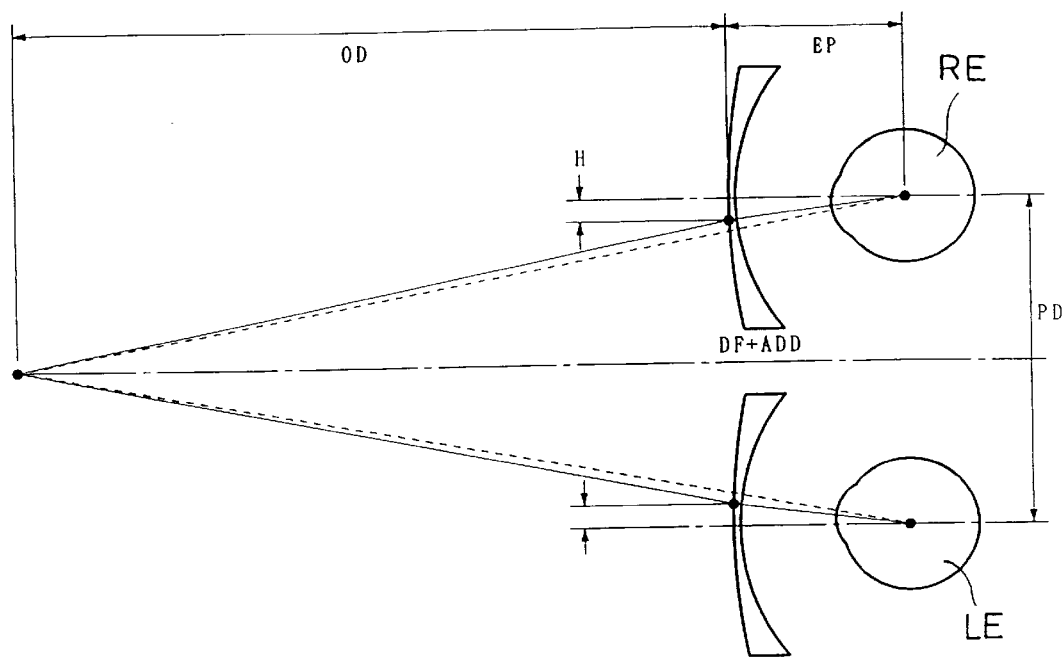
FIG. 10 is an explanatory view for explaining factors for determining the optimum amount of inset of progressive power spectacle lens.

FIG. 10 is an explanatory view for explaining factors for determining the optimum amount of inset of progressive power spectacle lens. In FIG. 10, "OD", "PD", "EP" and "H" represent the object distance for near vision, the pupillary distance between both eyes for distance vision, the distance from the point-of-rotation of the eyeball to the lens, and the amount of inset, respectively. As lens factors "DF" and "ADD" represent the distance vertex power (the vertex power of the distance portion) and the addition power, respectively.

FIGS. 11 through 14 each show a graph showing the variation of the optimum amount of inset relative to the distance vertex power when the object distance OD, the pupillary distance PD, the distance EP from the point-ofrotation of the eyeball to the lens, and the addition power ADD vary. In FIGS. 11, 12, 13 and 14, the object distance OD, the pupillary distance PD, the distance EP from the point-of-rotation of the eyeball to the lens, and the addition power ADD, respectively, are parameters. It can be seen from FIGS. 11 through 14 that the object distance OD specifically influences largely on the amount of inset.

Figure 15:
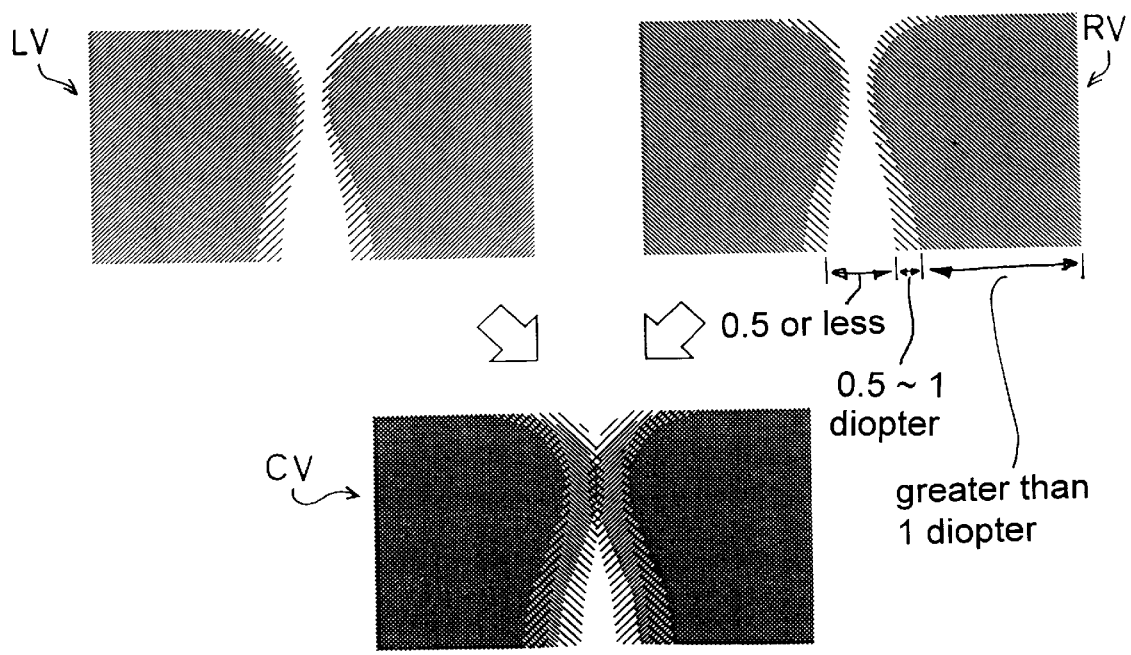
FIG. 15 is an explanatory view showing clear view areas when the amount of inset is inappropriate.
Figure 13:
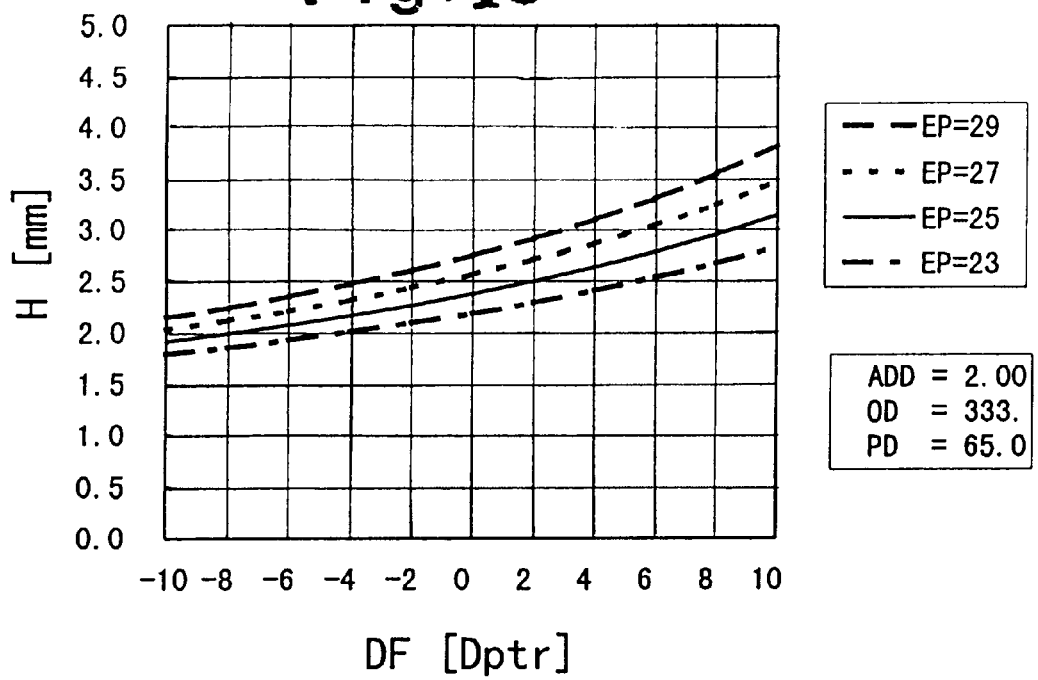
FIG. 13 is a graph showing the influence upon the optimum amount of inset when the distance from the point-of-rotation of the eyeball to the lens varies.
Figure 14:
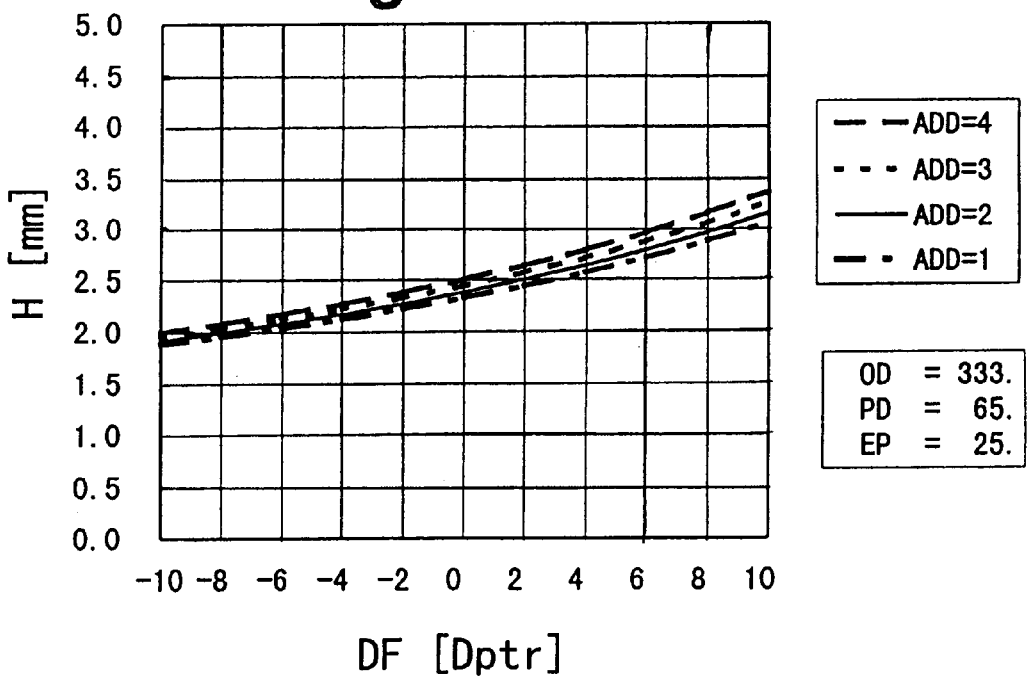
FIG. 14 is a graph showing influence upon the optimum amount of inset when the addition power varies.

An object distance OD of 33 cm is suitable to the majority of wearers of spectacles using progressive power spectacle lenses. However, for some lens-wearers an object distance OD of less than 33 cm is suitable, so as to view an object at a near distance closer . Such lens-wearers tend to choose progressive power spectacle lenses each having large addition power. However, the larger the addition power of a progressive power spectacle lens is, the narrower the clear view area for near vision becomes, so that the right and left clear view areas cannot be properly brought into coincidence in the case where the value of the amount of inset is inappropriate. For instance, when an object located at a distance of 20 cm is viewed through a pair of progressive power spectacle lenses each having the distance vertex power of 0.00 and the addition power of 4.00, the amount of inset of each lens needs to be set at approximately 4.5mm. However, under the same circumstances, according to a pair of conventional progressive multifocal spectacle lenses, the horizontal width of the clear view area obtained through both eyes becomes very small, approximately 60 percent of the clear view area obtained through right or left eye, as can be seen from FIG. 15. In FIG. 15 "LV", "RV", and "CV" each show a view area of the left progressive power spectacle lens, the right progressive power spectacle lens, and a pair of the right and left progressive power spectacle lenses, respectively, wherein a white area represents a clear view area thereof. The clear view area has an astigmatism of e.g., 0.5 diopter or less while the shaded areas of FIG. 15 refer to the degree of astigmatism with the darker shading representing larger degrees of astigmatism, the values being examples only.

In each of the following embodiments, the amount of inset of each progressive power spectacle lens is determined in accordance with not only the dioptric power but also the individual fitting condition data of the lens-wearer, so that the optimum clear view area, comfortable for each individual lens-wearer, for viewing an object at a near distance through both eyes can be obtained.

[FIRST EMBODIMENT]

Figure 1:
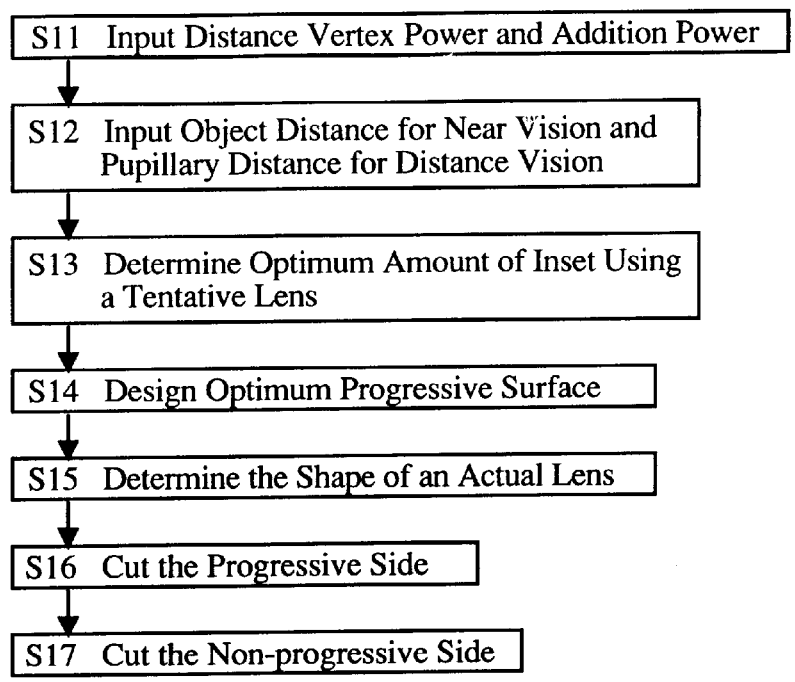
FIG. 1 is a flow chart showing the first embodiment of a method of manufacturing progressive power spectacle lenses to which the present invention is applied.

FIG. 1 shows a flow chart of the first embodiment of a method of manufacturing progressive power spectacle lenses.

At step S11 the distance vertex power DF and the addition power ADD which are suitable to the vision of the lens-wearer are input into (for example) a computer which is connected to a high-precision 3-D NC milling machine for forming lens surfaces, via an input device such as a keyboard. If there is any designated data to be input such as prismatic power, such data is also input to the computer. At step S12 the object distance OD and the pupillary distance PD obtained from the pre-measured individual fitting condition data of the lens-wearer are input to the computer. In step S12 further data such as the distance EP from the point-of-rotation of the eyeball to the lens and the pantoscopic angle of the lenses when fitted onto the lens-wearer may be additionally input into the computer. All the aforementioned data at steps S11 and S12 can be sent from a retailer (spectacles retailer) to a manufacturer's computer system via a computer network.

At step S13, in order to determine the optimum amount of inset, a ray-tracing simulation is carried out on a tentative progressive power spectacle lens which is designed in advance in accordance with standard fitting condition data. At step S14 the design of the progressive surface is modified so that the amount of inset thereof becomes identical to the optimum amount of inset obtained at step S13. It is preferable at step S14 for the design of the progressive surface to be modified while at the same time correcting the aberrations with consideration of the object distance OD assumed at that time. The shape of the progressive surface can be totally re-designed so that the amount of inset thereof becomes identical to the optimum amount of inset obtained at step S13.

At step S15 the amount of prism thinning, the center thickness and the surface shape of the non-progressive side are determined according to the effective diameter and the shape of the lens blank. Operations at steps 14 and 15 can be performed at the same time. At step S16 a cutting (milling) operation is carried out on the progressive side and subsequently at step S17 another cutting operation is carried out on the non-progressive side. In the cutting operation for the progressive side, NC data is prepared based on the shape of the progressive surface determined at step S14, and a high-precision 3-D NC milling machine is actuated in accordance with the NC data to cut a lens blank to form a progressive surface thereon. In the cutting operation for the non-progressive side, a conventional grinding technique for forming a spherical surface or a toric surface can be utilized. Note that the order of the operations at step S16 and S17 can be reversed.

The aforementioned first embodiment provides a custom-made system to make custom-made spectacles wherein the optimum shape of the progressive surface is designed in accordance with the individual fitting condition data of a lens-wearer and subsequently the progressive side is cut (milled) based on the designed optimum shape. According to this system, high-performance progressive power spectacle lens can be expected to be produced, but high cost of production cannot be avoided.

[SECOND EMBODIMENT]

Figure 2:
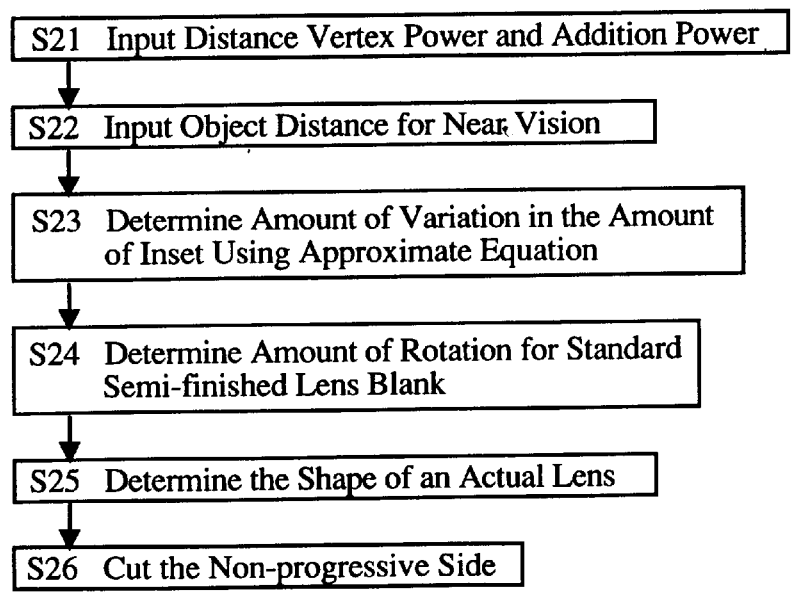
FIG. 2 is a f low chart showing the second embodiment of a method of manufacturing progressive power spectacle lenses to which the present invention is applied.

FIG. 2 shows a flow chart of the second embodiment of a method of manufacturing progressive power spectacle lenses. In the second embodiment, a standard semi-finished lens blank is used so as to provide a progressive power spectacle lens having the optimum amount of inset at a low production cost. A "standard semi-finished lens blank" hereinafter refers to a progressive power semi-finished lens blank which is provided in advance on the progressive side thereof with a progressive surface which is designed with an assumed standard fitting state of the lens-wearer. Accordingly, the standard semi-finished lens blank is provided on the progressive side thereof with a progressive surface having an amount of inset according to a pre-determined standard.

The operation at step S21 is identical to the operation at step S11. The operation at step S22 corresponds to the operation at step S12; however, only the object distance OD is input to the computer in the operation at step S22 for the purpose of simplifying the operation. At step S23 the change in the amount of inset ΔH (i.e., the difference between the optimum amount of inset and the standard amount of inset) is determined using an approximate equation which will be later discussed.

Figure 3:
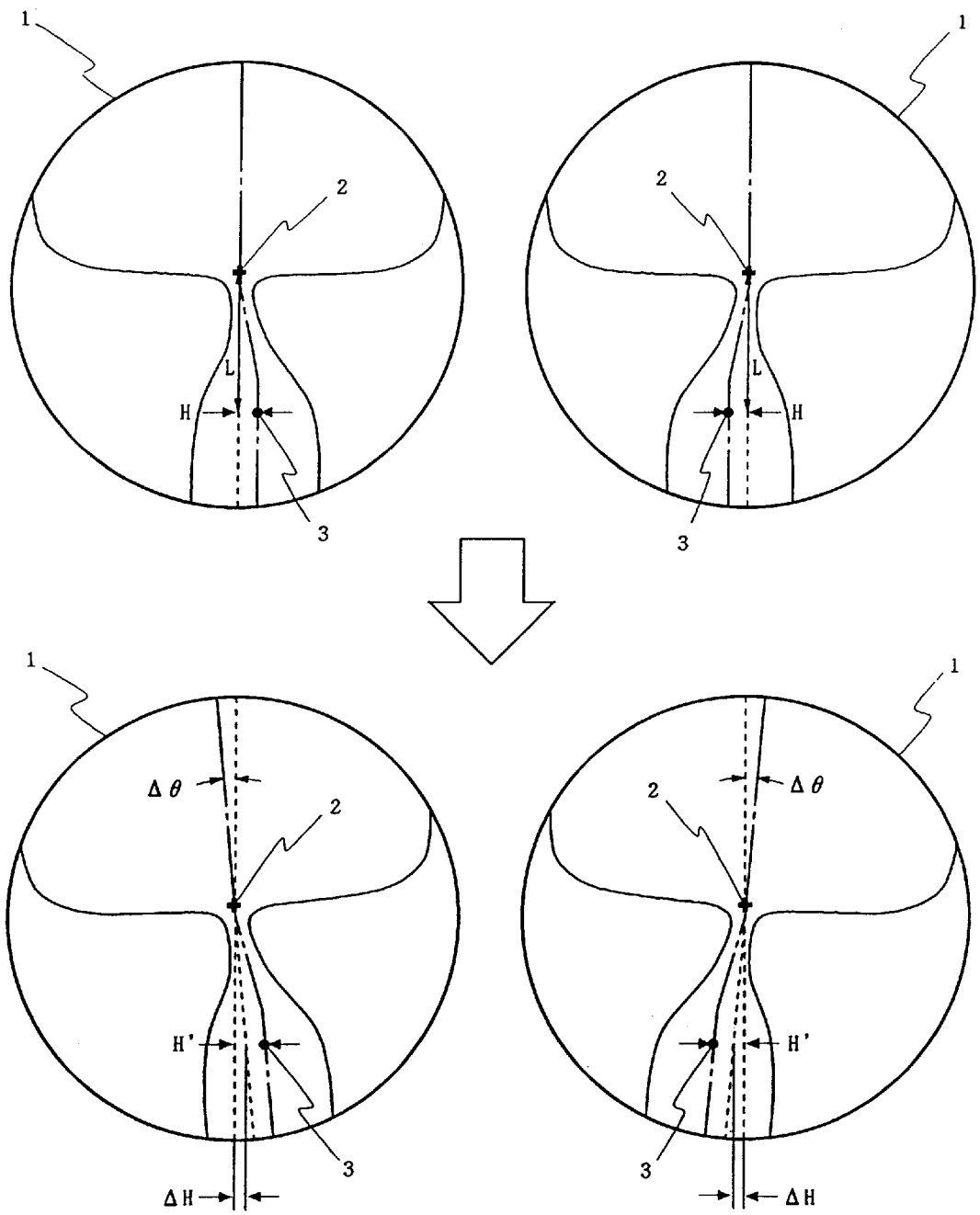
FIG. 3 is an explanatory view showing a method of changing the amount of inset of the right and left semi-finished lens blanks by rotating the same, in the second embodiment of the manufacturing method shown by the flow chart in FIG. 2.

At step S24 an amount of rotation Δθ for the standard semi-finished lens blank 1 is determined in accordance with the change in the amount of inset ΔH FIG. 3 shows a method of modifying the amount of inset by rotating the standard semi-finished lens blank 1. With the change in the amount of inset and the vertical distance between a fitting point 2 and a near reference point 3 represented by ΔH and L, respectively, the following equations are satisfied between the amount of rotation Δθ and the change in the amount of inset ΔH:

$$\Delta\theta \approx \Delta H/L \text{ (radians)}$$

$$\Delta H \approx \Delta\theta \times L$$

At step S25 the amount of prism thinning, the center thickness and the surface shape of the non-progressive side are determined according to the effective diameter and the shape of the lens blank with consideration that the standard semi-finished lens blank 1 has been rotated by the amount of rotation Δθ. At step S26 the cutting operation is carried out on the non-progressive side to form a spherical surface or a toric surface thereon with a conventional grinding technique.

The method of determining the change of the amount of inset ΔH using an approximate equation will be hereinafter discussed. The approximation of the optimum amount of inset H(mm) is determined according to the following approximate equation (1):

$$H=EP \times PD/2 \times \{EP+OD-EP \times OD \times (DF+ADD)/1000\} \quad (1)$$

wherein "DF" represents the distance vertex power (diopter);

"ADD" represents the addition power (diopter);

"OD" represents the object distance for near vision (mm);

"EP" represents the distance from the point-of-rotation of the eyeball to the lens (mm); and "PD" represents the pupillary distance between both eyes for distance vision (mm).

The approximate equation (1) is deduced via paraxial ray tracing. In an actual case of a positive lens having a large thickness, an error between the amount of inset determined by the approximate equation (1) and the amount of inset determined by an actual ray tracing will be large, whereas an error between the optimum amount of inset H determined in an assumed standard fitting position of the lens-wearer and the optimum inset H' determined in a nonstandard fitting position will not be so large in either case where the approximate equation (1) or the actual ray tracing is used to determine the optimum amount of inset. The change in the amount of inset ΔH is determined according to the following equation (2):

$$\Delta H=EP \times PD/2 \times \{EP+OD-EP \times OD \times (DF+ADD)/1000\} EP0 \times PD0/2 \times \{EP0+OD0-EP0 \times OD0 \times (DF+ADD)/1000\} \quad (2)$$

wherein "OD0" represents the object distance for near vision in the assumed standard fitting position (mm);

"EP0" represents the distance from the point-of-rotatio n of the eyeball to the lens in the assumed standard fitting position (mm); and "PD0" represents the pupillary distance between both eyes for distance vision in the assumed standard fitting position (mm).

The change in the amount of inset ΔH determined by the above equation (2) can be regarded as that from a standard semi-finished lens blank which is designed in advance by tracing actual rays.

In the case of the amount of rotation $\Delta\theta$ being large, the right or left side portion 14 or 15, whose aberrations are generally large, enters largely into the upper half part of the lens, which is not preferable. To restrain such a problem, for instance, an upper limit for the amount of rotation $\Delta\theta$ may be provided, or the amount of rotation $\Delta\theta$ can be determined by multiplying the same by a coefficient which makes the value of the calculated optimum amount of inset smaller. For instance in the case of the coefficient being 0.8, the amount of rotation $\Delta\theta$ can be determined by the following equation:

$$\Delta\theta=0.8\Delta H/L$$

[THIRD EMBODIMENT]

Figure 4:
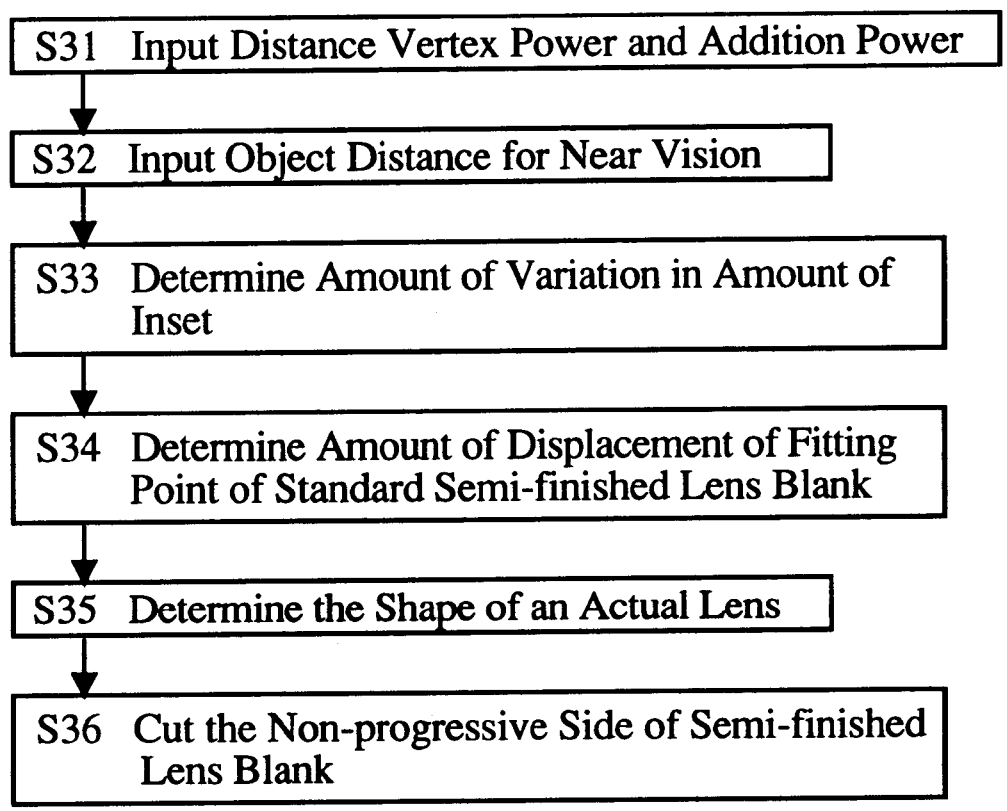
FIG. 4 is a f low chart showing the third embodiment of a method of manufacturing progressive power spectacle lenses to which the present invention is applied.

FIG. 4 shows a flow chart of the third embodiment of a method of manufacturing progressive power spectacle lenses. In the third embodiment, similar to the second embodiment, the standard semi-finished lens blank is used so as to provide a progressive power spectacle lens having an optimum amount of inset at a low production cost.

The operations at steps S31 and S32 are identical to the operations at step S21 and S22. At step S33 the change in the amount of inset $\Delta H$ is read out of a data table which is pre-calculated. FIG. 5 shows an example of such a data table. Column "A" of FIG. 5 is a list showing the relationship between the distance vertex power DF and the change in the amount of inset $\Delta H$, wherein only the object distance for near vision OD is changed while the pupillary distance between both eyes for distance vision PD and the distance EP from the point-of-rotation of the eyeball to the lens are set as constants (PD=65.00, EP=25.00). Likewise, the column "BB" of FIG. 5 is another list showing the relationship between the distance vertex power DF and the change in the amount of inset $\Delta H$, wherein only the pupillary distance between both eyes for distance vision PD is changed while the object distance for near vision OD and the distance EP from the point-of-rotation of the eyeball to the lens are set as constants (OD=333.00, EP=25.00). Likewise, the column "C" of FIG. 5 is yet another list showing the relationship between the distance vertex power DF and the change in the amount of inset $\Delta H$, wherein only the distance EP from the point-of-rotation of the eyeball to the lens is changed while the object distance for near vision OD and the pupillary distance between both eyes for distance vision PD are set as constants (OD=333.00, PD=65.00). In the data table shown in FIG. 5, although the step of change in each parameter is large, the step can be smaller in an actual data table used.

At step S34, the amount of displacement of the fitting point 2 of the standard semi-finished lens blank 1 is determined in accordance with the change in the amount of inset determined from the data table shown in FIG. 5. The amount of displacement of the fitting point 2 $\Delta HF$ can be expressed by the following equation:

$$\Delta HF=-\Delta H$$

wherein "$\Delta H$" represents the change in the amount of inset.

Figure 6:
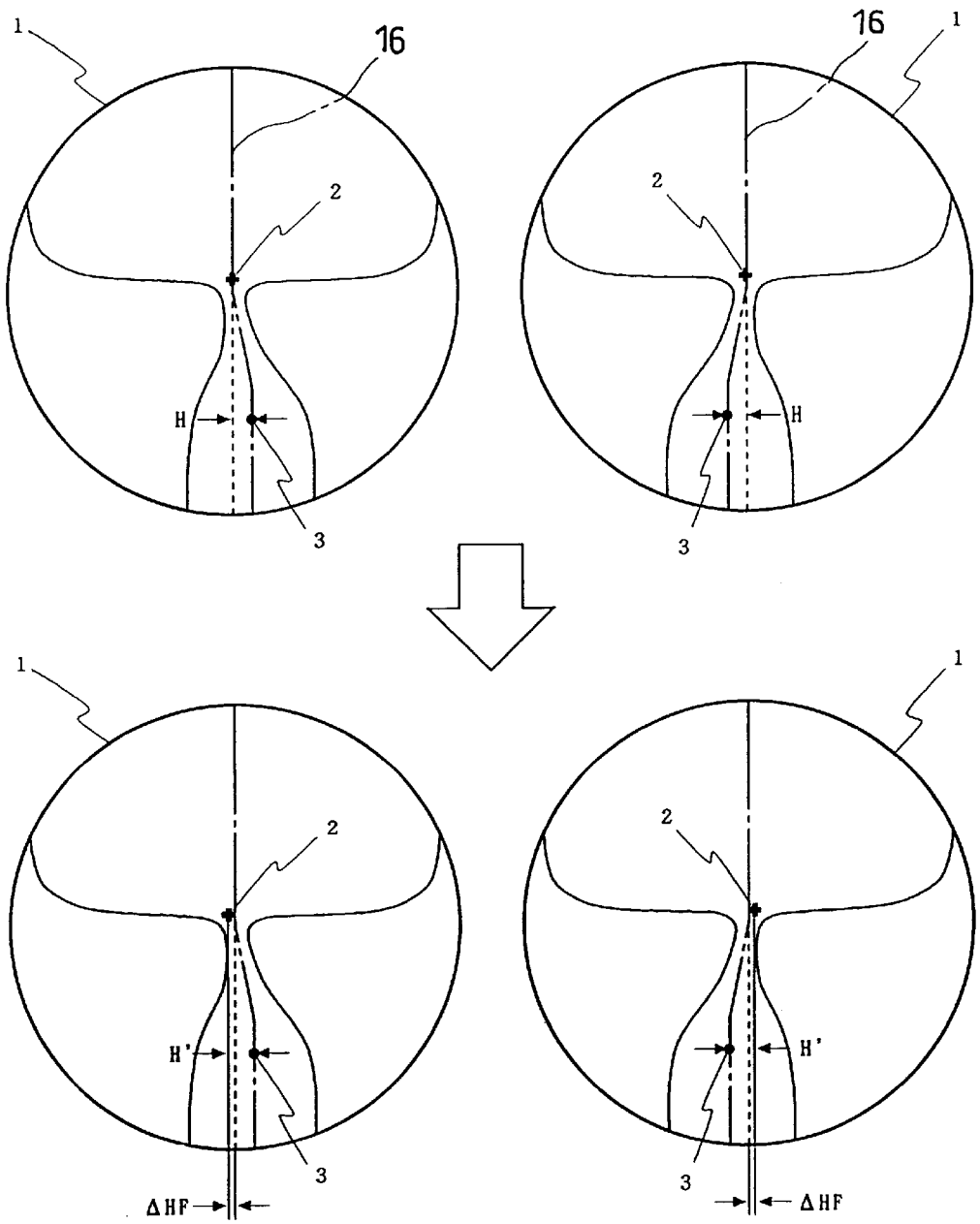
FIG. 6 is an explanatory view showing a method of changing the amount of inset by displacing the fitting point, in the third embodiment of the manufacturing method shown by the flow chart in FIG. 4.
Figure 7:
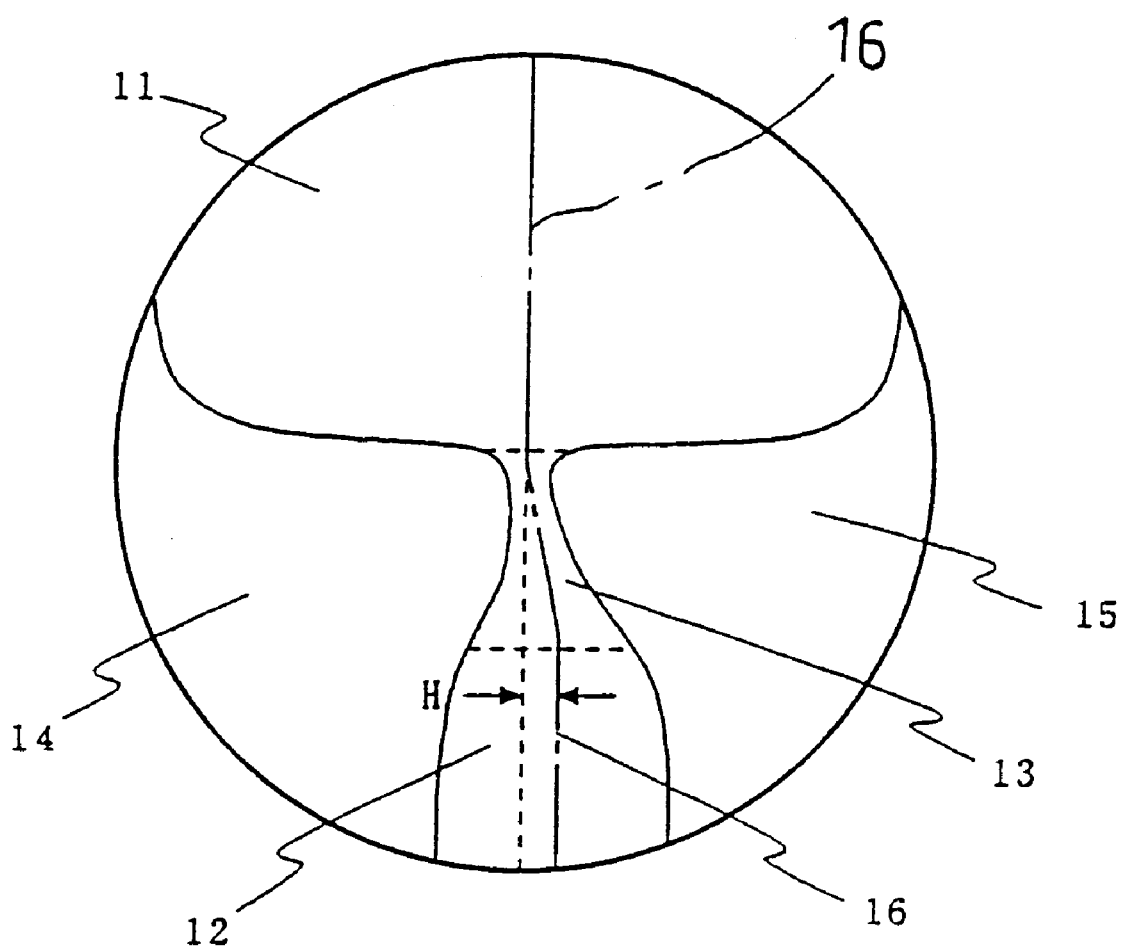
FIG. 7 is a front elevational view of a conventional progressive power spectacle lens.
Figure 8:
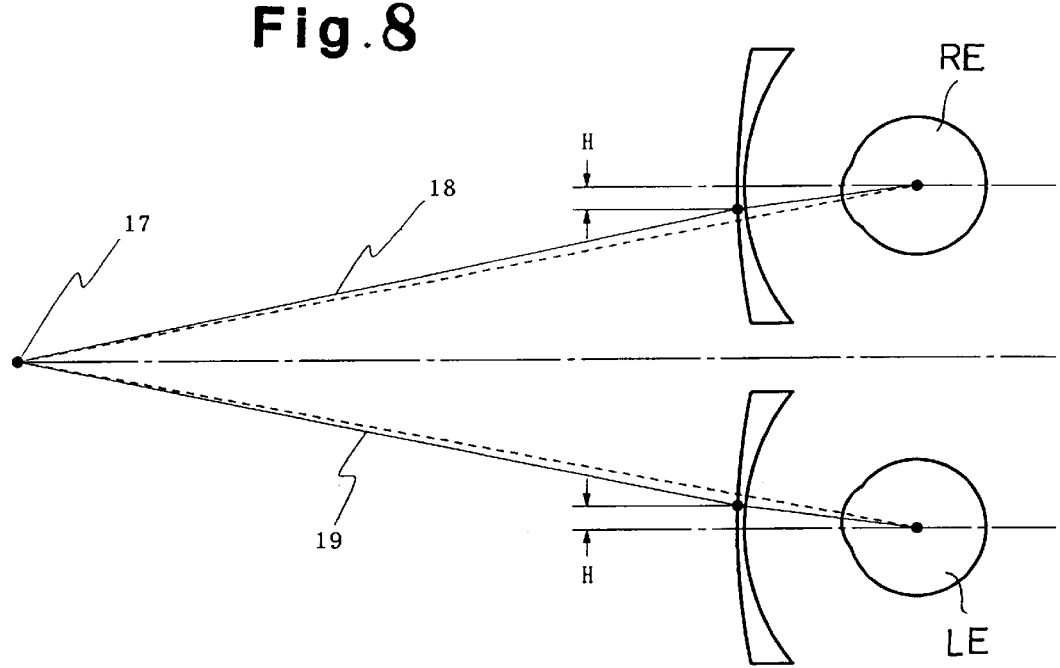
FIG. 8 is an explanatory view showing a state in which right and left lines of sight are bent through negative lenses.
Figure 9:
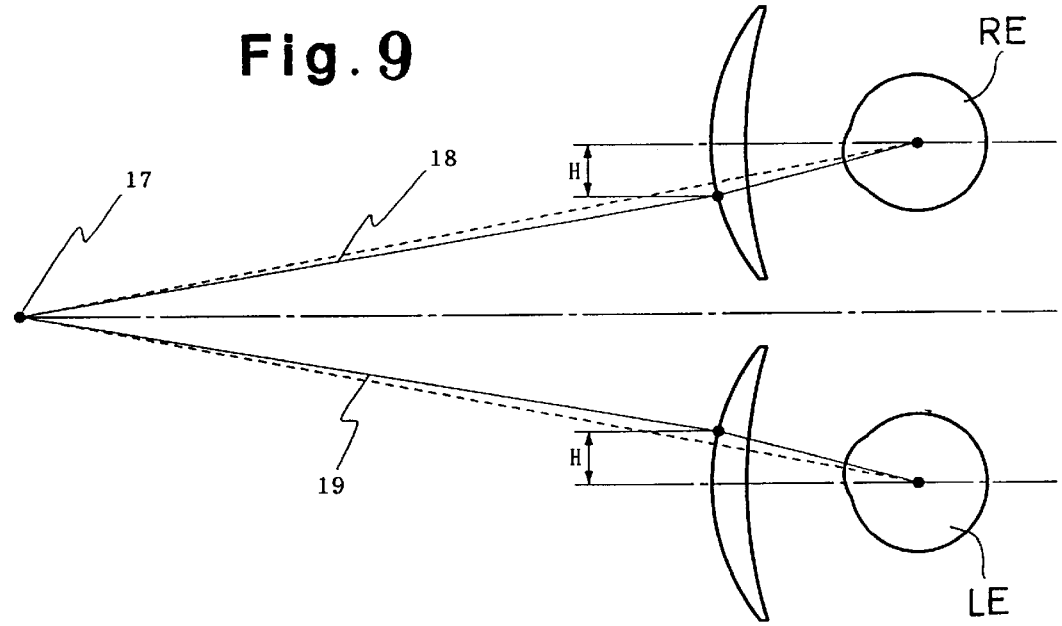
FIG. 9 is an explanatory view showing a state in which right and left lines of sight are bent through positive lenses.

FIG. 6 shows a method of changing the amount of inset by displacing the fitting point 2.

At step S35 the amount of prism thinning, the center thickness and the surface shape of the non-progressive side are determined according to the effective diameter and the shape of the lens blank with consideration that the fitting point 2 has been displaced by the amount of displacement $\Delta HF$. At step S36 the cutting operation is carried out on the non-progressive side to form a spherical surface or a toric surface thereon via a conventional grinding technique.

Strictly speaking, shifting the fitting point has a bad influence on the distance portion of the lens. However, the clear view area for distance vision is generally larger in width than the clear view area for near vision, so that the influence is generally negligible even if the fitting point is slightly displaced. However, to reduce such influence, it is possible to reduce the amount of displacement $\Delta HF$. For instance, the amount of displacement $\Delta HF$ can be decreased by 20 percent, i.e., the following equation can be adopted:

$$\Delta HF=-0.8\Delta H$$

Figure 16:
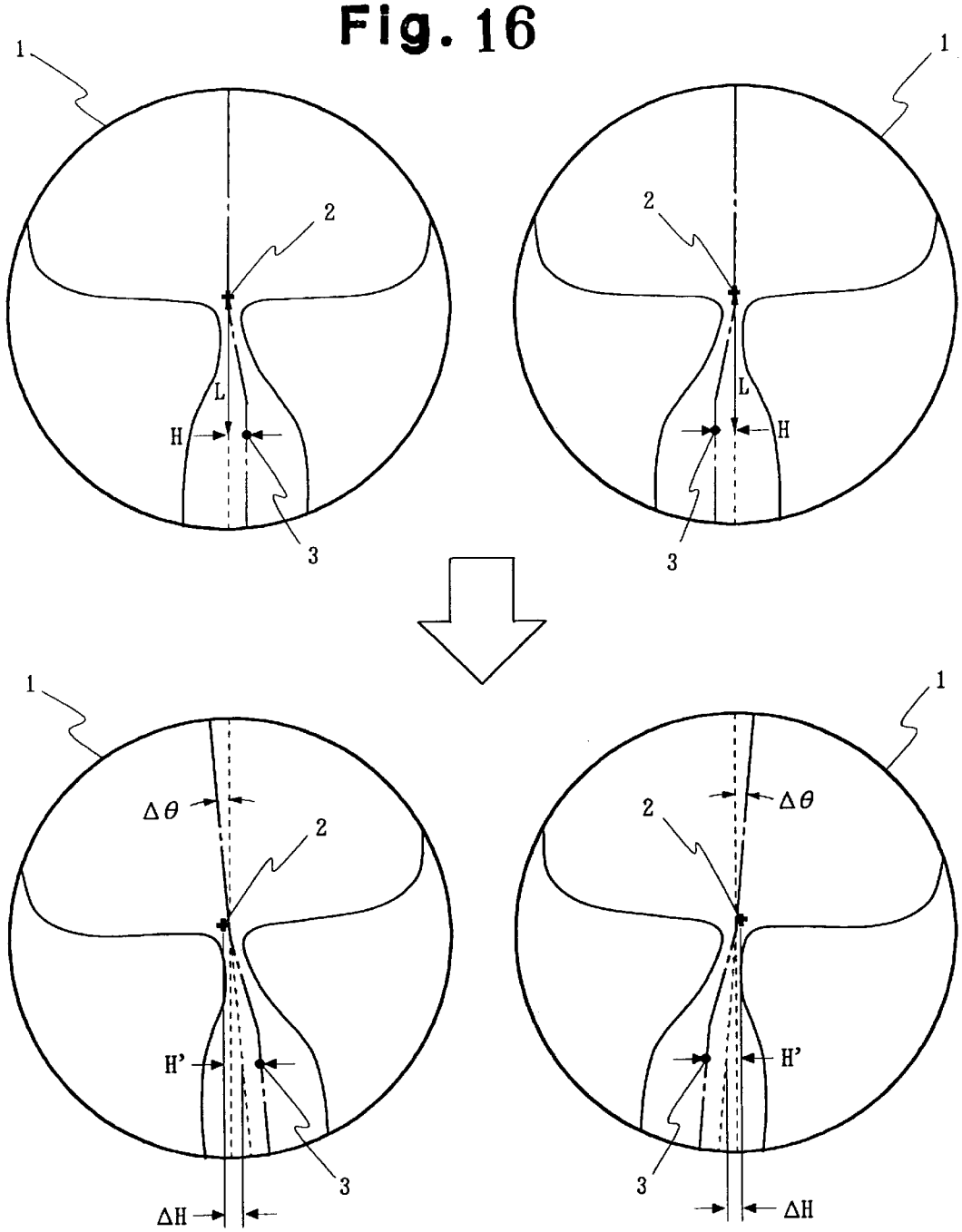
FIG. 16 is an explanatory view showing a combination of the methods used for the changing the amount of inset in the second and third embodiments by rotating the lens blanks and by displacing the fitting point.

It is possible to combine the method in the second embodiment of modifying the amount of inset by rotating the standard semi-finished lens blank with the method of changing the amount of inset by displacing the fitting point in the third embodiment (see FIG. 16). In this case, for instance, the necessary change in the amount of inset $\Delta H$ can be determined using a half of the variation in the amount of inset $\Delta H$ which is determined by rotating the standard semi-finished lens blank 1 and a half of the variation in the amount of inset $\Delta H$ which is determined by displacing the fitting point 2 if the following equations are satisfied:

$$\Delta\theta=0.5\Delta H/L$$

$$\Delta HF=-0.5\Delta H$$

wherein "$\Delta H$" represents the desired amount of change in the amount of inset.

Of course, the ratio of the amount of rotation $\Delta\theta$ to the amount of displacement of the fitting point $\Delta HF$ can be changed.

As can be understood from the foregoing, according to each embodiment, since the amount of inset of each progressive power spectacle lens is determined in accordance with not only the dioptric power but also the individual fitting condition data of a lens-wearer, a pair of progressive power spectacle lenses through which a clear view area for near vision for both eyes can be obtained. Accordingly, problems which occur in a pair of conventional progressive power spectacle lenses wherein the right and left reading fields cannot be properly brought into coincidence, in the case where the value of the amount of inset is inappropriate, is improved. Therefore, an adequate clear view area for near vision for both eyes can be obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A method of manufacturing a progressive power spectacle lens, comprising:

preparing individual fitting condition data for a lens-wearer;

determining an amount of inset in accordance with said individual fitting condition data;

designing the shape of a progressive surface so that said amount of inset becomes identical to an optimum amount of inset determined in accordance with said individual fitting condition data; and forming said progressive surface having said designed shape on the progressive side of a lens blank.

2. The manufacturing method according to claim 1, wherein said individual fitting condition data comprises data regarding the object distance for near vision.

3. The manufacturing method according to claim 2, wherein said individual fitting condition data further comprises data regarding the pupillary distance between both eyes for distance vision.

4. The manufacturing method according to claim 2, wherein said individual fitting condition data further comprises the distance from the point-of-rotation of each eyeball of said lens-wearer to each said spectacle lens.

5. The manufacturing method according to clam 1, wherein determining comprises determining a difference between an optimum amount of inset and an amount of inset according to a pre-determined standard.

6. A method of manufacturing a progessive power spectacle lens, comprising:

preparing individual fitting condition data for a lens-wearer;

determining an amount of inset in accordance with said individual fitting condition data;

preparing a progressive power semi-finished lens blank which is provided on a progressive side thereof with a progressive surface having an amount of inset according to a pre-determined standard;

rotating said progressive power semi-finished lens blank to have a designed amount of inset; and cutting a non-progressive side of said progressive power semi-finished lens blank.

7. The manufacturing method according to claim 6, wherein said individual fitting condition data comprises data regarding the object distance for near vision.

8. The manufacturing method according to claim 7, wherein said individual fitting condition data further comprises data regarding the pupillary distance between both eyes for distance vision.

9. The manufacturing method according to claim 7, wherein said individual fitting condition data further comprises the distance from the point-of-rotation of each eyeball of said lens-wearer to each said spectacle lens.

10. The manufacturing method according to claim 6, wherein determining comprises determining a difference between an optimum amount of inset and an amount of inset according to a pre-determined standard.

11. A method of manufacturing a progressive power spectacle lens, comprising:

preparing individual fitting condition data for a lens-wearer;

determining an amount of inset in accordance with said individual fitting condition data;

preparing a progressive power semi-finished lens blank which is provided on a progressive side thereof with a progressive surface having the amount of inset according to a pre-determined standard;

displacing a fitting point on said progressive power semi-finished lens blank to have a desired amount of inset; and cutting a non-progressive side of said progressive power semi-finished lens blank.

12. The manufacturing method according to claims 11, wherein said individual fitting condition data comprises data regarding the object distance for near vision.

13. The manufacturing method according to claim 12, wherein said individual fitting condition data further comprises data regarding the pupillary distance between both eyes for distance vision.

14. The manufacturing method according to claim 12, wherein said individual fitting condition data further comprises the distance from the point-of-rotation of each eyeball of said lens-wearer to each said spectacle lens.

15. The manufacturing method according to claim 11, wherein determining comprises determining a difference between an optimum amount of inset and an amount of inset according to a pre-determined standard.

16. A method of manufacturing a progressive power spectacle lens, comprising:

preparing individual fitting condition data for a lens-wearer;

determining an amount of inset in accordance with said individual fitting condition data;

preparing a progressive power semi-finished lens blank which is provided on a progressive side thereof with a progressive surface having an amount of inset according to a pre-determined standard;

rotating said progressive power semi-finished lens blank while displacing a fitting point on said progressive power semi-finished lens blank to have a desired amount of inset; and cutting a non-progressive side of said progressive power semi-finished lens blank.

17. The manufacturing method according to claim 16, wherein said individual fitting condition data comprises data regarding the object distance for near vision.

18. The manufacturing method according to claim 17, wherein said individual fitting condition data further comprises data regarding the pupillary distance between both eyes for distance vision.

19. The manufacturing method according to claim 17, wherein said individual fitting condition data further comprises the distance from the point-of-rotation of each eyeball of said lens-wearer to each said spectacle lens.

20. The manufacturing method according to claim 16, wherein determining comprises determining a difference between an optimum amount of inset and an amount of inset according to a pre-determined standard.

* * * * *

UNITED STATES PATENT AND TRADEMARK OFFICE
CERTIFICATE OF CORRECTION

PATENT NO. : 6,193,370 B1
DATED : February 27, 2001
INVENTOR(S) : Moriyasu Shirayanagi It is certified that error appears in the above-identified patent and that said Letters Patent is hereby corrected as shown below:

<u>Title page,</u>
Item [73], Assignee: "Asahi Kogaku Kabushiki Kaisha, Tokyo (JP)" should be --- Asahi Kogaku Kogyo Kabushiki Kaisha, Tokyo (JP) --.

Signed and Sealed this

Fifth Day of February, 2002

Attest:

JAMES E. ROGAN
*Attesting Officer*   *Director of the United States Patent and Trademark Office*